United States Patent [19]
Bonadies et al.

[11] Patent Number: 4,815,339
[45] Date of Patent: Mar. 28, 1989

[54] ANTENNA SHAFT POSITIONING DEVICE

[75] Inventors: Gary N. Bonadies, Silver Spring; Mark O'Clair, Clinton; David W. Parry, Ellicott City, all of Md.

[73] Assignee: The United States of America as represented by the Secretary of the Air Force, Washington, D.C.

[21] Appl. No.: 922,642

[22] Filed: Oct. 24, 1986

Related U.S. Application Data

[63] Continuation-in-part of Ser. No. 598,780, Apr. 11, 1984, abandoned.

[51] Int. Cl.$^4$ .......................................... B23Q 16/00
[52] U.S. Cl. .................................. 74/813 L; 74/816; 192/139; 343/757
[58] Field of Search ............. 74/813 L, 813 C, 813 R, 74/822, 817, 816, 10.2, 526; 192/139, 142 A, 138, 143, 149; 188/82.2, 82.3, 82.4, 82.7, 82.34, 31, 60, 69, 163, 171, 173; 343/757

[56] References Cited

U.S. PATENT DOCUMENTS

| | | | |
|---|---|---|---|
| 390,190 | 9/1888 | Richards | 74/813 L |
| 2,150,216 | 3/1939 | Fuller et al. | 192/149 X |
| 2,487,349 | 11/1949 | Marholz | 188/110 |
| 2,753,016 | 7/1956 | Bentley | 188/69 X |
| 2,824,452 | 2/1958 | Colby | 74/10.2 |
| 2,844,038 | 7/1958 | Danta | 74/10.2 |
| 2,900,848 | 8/1959 | Henn-Collins | 74/768 |
| 2,938,606 | 5/1960 | Passman | 188/82.7 X |
| 2,978,924 | 4/1961 | Georges | 74/526 |
| 3,001,411 | 9/1961 | Wittenborg | 74/816 X |
| 3,012,447 | 12/1961 | Wallace | 74/526 |
| 3,272,031 | 9/1966 | Beck | 74/526 |
| 3,339,681 | 9/1967 | Holladay | 188/82.7 X |
| 3,345,751 | 10/1967 | Barzee et al. | 408/71 X |
| 3,572,135 | 3/1971 | Williams | 74/10.54 |
| 3,717,231 | 2/1973 | Kaufeldt | 192/139 |
| 3,733,929 | 5/1973 | Fatula | 74/813 L |
| 3,753,480 | 8/1973 | Okano | 192/149 X |
| 3,856,119 | 12/1974 | Harrington | 188/69 X |
| 3,913,417 | 10/1975 | Vangor | 74/813 L |
| 4,428,255 | 1/1984 | Fischer | 74/813 L |
| 4,574,660 | 3/1986 | Kaminsky et al. | 74/822 |
| 4,646,100 | 2/1987 | England | 74/816 X |

FOREIGN PATENT DOCUMENTS

| | | | |
|---|---|---|---|
| 2232855 | 2/1973 | Fed. Rep. of Germany | 74/813 R |
| 848070 | 10/1939 | France | 188/82.7 |
| 180448 | 8/1962 | Sweden | 74/813 L |
| 333613 | 12/1958 | Switzerland | 74/822 |
| 212008 | 5/1968 | U.S.S.R. | 74/813 L |
| 319016 | 1/1972 | U.S.S.R. | 343/757 |
| 607707 | 5/1978 | U.S.S.R. | 74/813 L |

OTHER PUBLICATIONS

Indexing Apparatus, Research Disclosure, 3/82.

Primary Examiner—Gary L. Smith
Assistant Examiner—Rodney M. Lindsey
Attorney, Agent, or Firm—Jules J. Morris; Donald J. Singer

[57] ABSTRACT

An apparatus for stopping a rotating antenna shaft at a distinct position intermediate two end stop positions 23, 24. Paddle 12 on the rotating shaft 21 cooperates with intermediate stop assembly 26 to arrest bi-directional shaft rotation at an intermediate point when such stopping is desired, the intermediate stop assembly being activated by springs 38, 39 and deactivated by action of solenoids 30, 31.

5 Claims, 3 Drawing Sheets

ANTENNA SHAFT POSITIONING DEVICE

STATEMENT OF GOVERNMENT INTEREST

The invention described herein may be manufactured and used by or for the Government for governmental purposes without the payment of any royalty thereon.

RELATED APPLICATION

This is a continuation-in-part of application Ser. No. 598,780 filed Apr. 11, 1984 now abandoned.

BACKGROUND OF THE INVENTION

The present invention relates to an antenna shaft positioning device, and more particularly, to an apparatus used to stop a rotating shaft at a precise angular position between two end stops.

It is known in the art to use mechanical limit stops to position a shaft. U.S. Pat. No. 2,844,038 to Danta discloses a bi-directional mechanical stop system which provides for two opposed limit stops. An additional rotation-limiting apparatus is disclosed in U.S. Pat. No. 2,487,349 to Marholz which describes an apparatus for limiting the rotation of a driven shaft to a predetermined number of revolutions from a reference point. These and other like prior art devices provide for stopping rotation of a mechanism between two fixed points, however, they fail to teach means for precisely stopping the motion of a rotating shaft at a distinct point in the shaft's axis of rotation in between two fixed end stops in a manner suitable for use with a highly accurate antenna movement. An antenna shaft must be stopped at a precise location without exceptional jarring that might damage a delicate antenna mast. Thus, while halting the rotation of an element at two points is typically achieved through the use of two end stops, periodically stopping a rotating shaft precisely at a fixed intermediate point, in between the two end stops, requires a mechanism which can capture the rotating element at the intermediate point when desired, and yet at other times allow the shaft to rotate bidirectionally between the two end stops.

It is an object of the present invention, therefore, to provide a shaft arresting means suitable for selective stopping an antenna shaft at an intermediate point in its rotation without damaging that antenna.

It is a further object of the invention to provide a fail-safe locking mechanism which stops the antenna at a preferred intermediate position of power is lost.

SUMMARY OF THE INVENTION

In accordance with the teachings of the present invention, a precision apparatus is disclosed for stopping a rotating antenna shaft at a distinct point intermediate two end stop positions. More particularly, a shaft rotatable between two end stops is provided with an engaging member. This member is engaged by an intermediate stop at a fixed location when it is desired to arrest shaft movement.

The present invention provides a mechanism capable of selectively capturing a rotating shaft at an intermediate point, between two end points, the mechanism allowing the shaft to otherwise freely rotate bidirectionally between the two end points. The mechanism comprises a single or dual solenoid system arranged to provide fail-safe stopping of the shaft at the intermediate location of power is lost to the shaft.

DESCRIPTION OF THE DRAWINGS

The present invention will be more clearly understood by reference to the following detailed description of several preferred embodiments of the present invention in conjunction with the accompanying drawings, in which.

DETAILED DESCRIPTION

Figure 1:
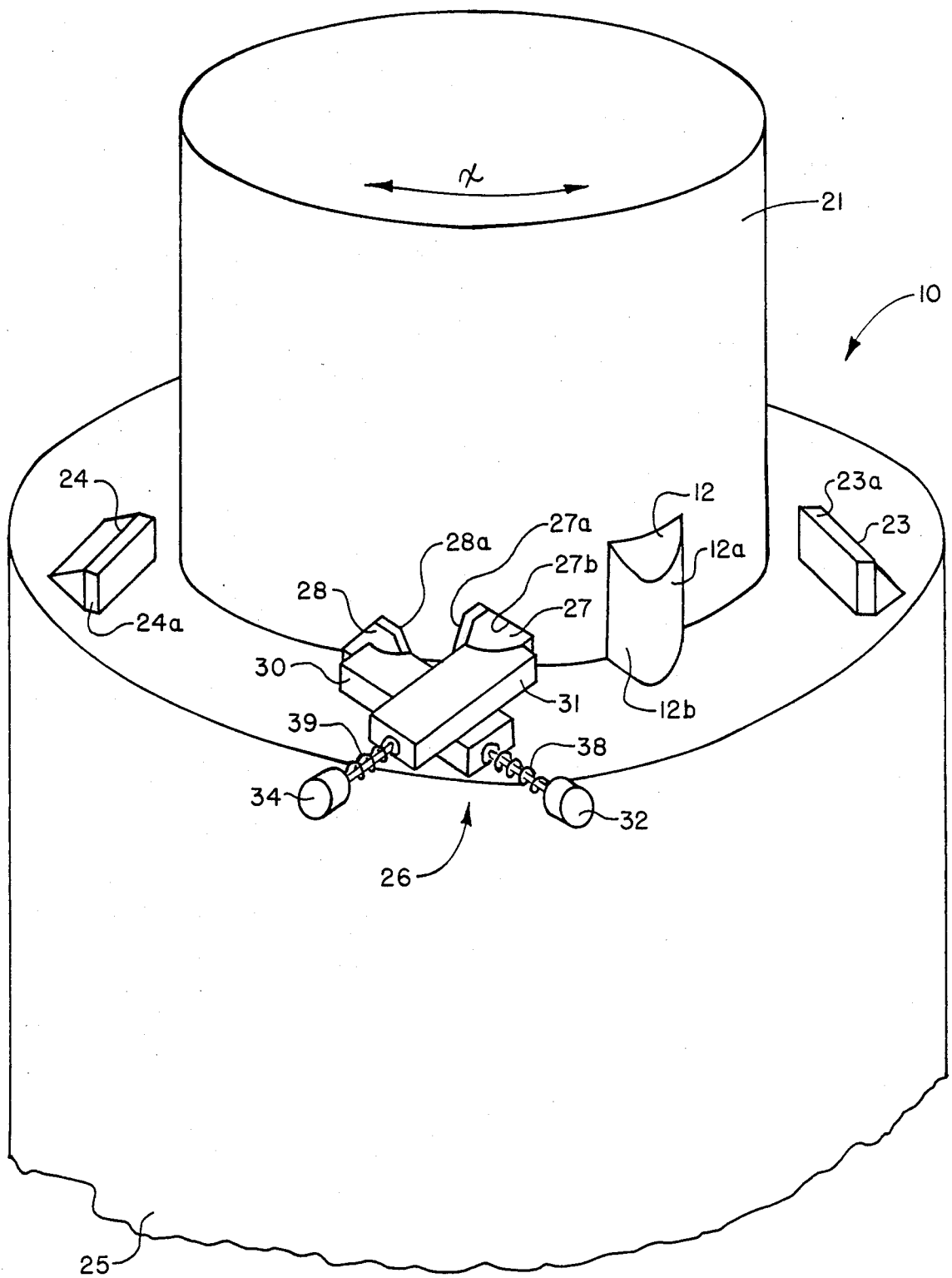
FIG. 1 is a perspective view showing a preferred embodiment of the present invention.

Referring now to FIG. 1, there is shown a perspective view of a preferred embodiment of the present invention. The shaft arresting mechanism 10 illustrated in FIG. 1 comprises a stationary housing 25 to which a shaft 21 is rotatably coupled. Shaft 21 can rotate in a clockwise or counter-clockwise direction, as indicated by arrow "X". The shaft 21 is provided with a positioning key, or paddle, 12.

Preferably, the paddle 12 is shaped as an isosceles or an equilateral triangle in cross-section (from above), where opposed abutment surfaces 12a and 12b thereof are symmetrical. Paddle 12 cooperates with stops 23, 24 and intermediate stop assembly 26 to precisely arrest the shaft 21, as further described below.

Affixed to housing 25 is a first fixed end stop 23 and an opposing second fixed end stop 24. The end stop further comprises resilient pads 23a, 24a to cushion the shaft 21 through paddle 12 during stops. The shaft normally rotates back and forth between end stops 23 and 24 which are engaged by paddle 12. Also affixed to housing 25 between stops 23 and 24 is a selective intermediate stop assembly 26.

Stop assembly 26 comprises a first solenoid 30 having a core, or plunger 32. The plunger 32 is urged into an engaged position adjacent to shaft 21 by means of a spring 38 which is connected to the stationary solenoid housing and the movable plunger. A stop 28 is mounted to plunger 32 for movement therewith. Mounted on top of solenoid 30 is second solenoid 31 having a core, or plunger, 34, where plunger 34 is urged adjacent to shaft 21 by means of spring 39. Affixed to solenoid 31 at plunger 34 is a stop 27. Stops 27 and 28 are displaceable only in the axis of travel of plungers 32, 34, respectively.

The controllable stops 27, 28 further comprise resilient buffers 27a, 28a for cushioning the shaft 21 when it is stopped. Since the shaft is connected to a possibly delicate antenna assembly, it is important to prevent damage to the antenna from abrupt shaft stops. For this reason end stops 23, 24 can also be equipped with resilient pads 23a, 24a to cushion the paddle 12 and shaft 21. Preferably the resilient pads comprise a relatively hard rubber-like material that maintains its shape for accurate shaft positioning.

In operation of the embodiment of FIG. 1, intermediate stop assembly 26 stops rotating shaft 21 at a fixed position in between the two end stops 23, 24. This fixed position is determined by the location of assembly 26 on stationary housing 25 and by the location of paddle 12.

When shaft 21 rotates from, for example, end stop 23 toward end stop 24, the paddle 12, pushes up against surface 27b of stop 27. The paddle pushes stop 27 along the axis of the solenoid 31 and spring 39; this extends the spring and moves the stop which permits the paddle to pass by stop 27. Immediately thereafter paddle 12 moves adjacent to stop 28, and is arrested by cushioned surface 28a. Spring 39 then retracts to extend stop 27 back to its original position, thus "sandwiching" the paddle 12 in the fixed position defined between the inner surfaces 27a, 28a of stops 27 and 28. As can be appreciated from FIG. 1, this arrangement is bi-directional and operates in the above-described manner whether paddle 12 displaces stop 27 and abuts stop 28, or displaces stop 28 and abuts stop 27.

The paddle is unable to push back either stop 27, 28 when abuting their internal surfaces 27a, 28a since the paddle isn't pushing against the solenoids' 29, 30 axis of movement. The two solenoids 29, 30 are activated to pull both stops 27, 28 away from paddle 12 to allow continuous rotation of the shaft between stops 23 and 24. Only when solenoids 30, 31 are activated are both stops 26, 27 retracted from paddle 12 to permit resumption of shaft rotation.

Mechanism 26 provies for fail-safe operation of the antenna shaft. The shaft 21 is captured automatically in the event of a system failure by action of the springs 38 and 39. The springs either extend the stops 27 and 28 if the stops were previously withdrawn by means of solenoids 30 and 31, or if already extended, maintain the stops in the extended position.

Figure 2:
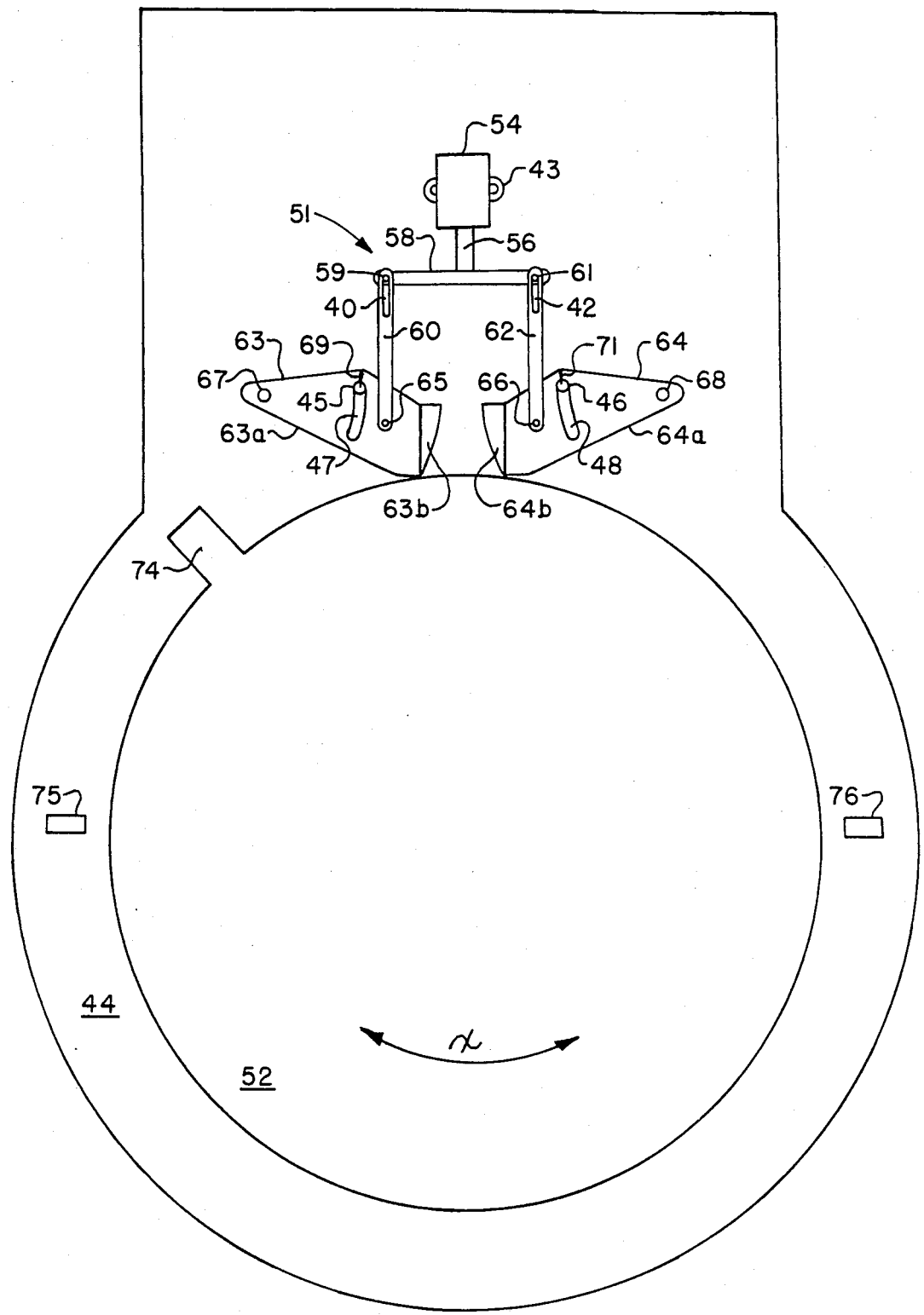
FIG. 2 is a top view of an alternative embodiment of the present invention.

Referring now to FIG. 2, there is shown a top plan view of an embodiment of a shaft positioning device of the present invention having a single solenoid actuator. This embodiment comprises a rotating shaft 52 coupled to a stationary housing 44. Paddle 74 is circumferentially affixed to the antenna shaft 52.

Fixedly attached to the housing 44 by fasteners 43 is an intermediate stop assembly 51. The stop assembly 51 includes an actuator 54, such as a solenoid or motor, having a movable plunger 56. Fixedly attached to the plunger 56 is a cross member 58. Cross member 58 is pivotably coupled to element 60 by pin 59 at slot 40, and to element 62 by pin 61 at slot 42. Element 60 is pivotally coupled to a lever arm 64 at pin 66. Lever arm 63 is in turn pivotally attached to the housing 44 by pin 67, while lever 64 is similarly coupled to the housing by pin 68. Thus, movement of actuator 54 is transmitted by means of plunger 56, cross-member 58 and elements 60, 61 to lever arms 63, 64, to cause retraction of the lever arms from the shaft 52. Return action of the levers 63, 64 is provided by springs 69, 71 which are each attached to one lever and a fixed post 45, 46 on the base 44.

Lever arms 63, 64 comprise first and second displaceable stop members, having first striking surfaces 63a, 64a, respectively. Second striking surfaces 63b, 64b, are also defined on lever arms 63, 64. Second striking surfaces 63b, 64b are each lined with rubber or other resillient material. As mentioned above, spring 69 connects housing mounted pin 45 to lever arm 63 and spring 71 connects housing mounted pin 46 to lever arm 64. Rotation of the lever arms about pins 67 or 68 extends their respective springs. As the lever arms pivot lever arm slots 47, 48 track by the housing mounted pins 45, 46, respectively to control lever movement. Springs 69 and 71 are provided to retract and urge lever arms 63, 64, respectively, into the capture position as shown.

End stops 75 and 76 are coupled to the housing and are similar in form to end stops 23, 24 of the embodiment of FIG. 1. The axis of rotation of shaft 52 is indicated by arrow "X".

In operation of the shaft positioning device of FIG. 2, where paddle 74 is first positioned near end stop 75, for example, and shaft 52 is rotated toward end stop 76, paddle 74 first comes in contact with striking surface 63a of lever 63. This causes lever 63 to pivot around pin 67 and extends spring 69. Lever movement thus allows passage of paddle 74. Paddle 74 then contacts the rubber-lined inner face 64b of lever 64 which stops rotation of the shaft by preventing further movement of the paddle. The spring 69 attached to lever 63 urges lever 63 back into its initial capture position after passage of the paddle; thus, paddle 74 is captured between the two levers 63, 64. As with the device of FIG. 1, the paddle is captured from inadvertent escape in either direction. When it is necessary to rotate the shaft 52 to a new position the actuator 54 is activated and the two levers 63, 64 rotate about their respective pins 67, 68 to allow continued movement of the paddle. This device is bi-directional, and will operate in the above described manner whether paddle 74 displaces lever 63 and strikes face 64b of lever 64, or displaces lever 64 and strikes rubber-lined face 63b of lever 63.

Figure 3:
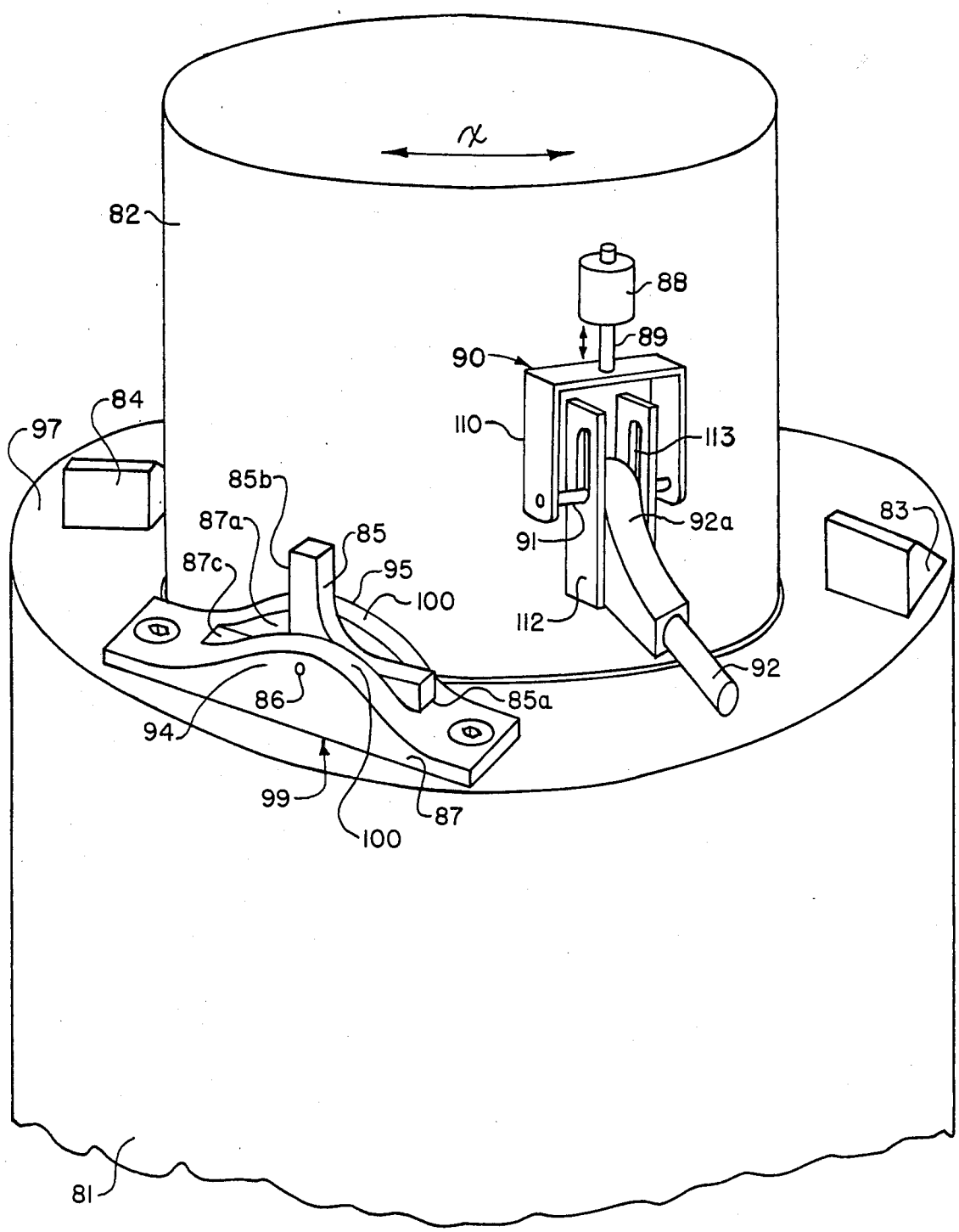
FIG. 3 is a perspective view of an additional alternative embodiment of the present invention.

Referring now to FIG. 3, there is shown a perspective view of another embodiment of the present invention. The embodiment illustrated in FIG. 3 comprises a stationary shaft housing 81 to which is rotatably affixed an antenna shaft 82. The axis of rotation of shaft 82 is shown by means of arrow "X". Fixed to a horizontal top face 97 of stationary shaft housing 81 is a first end stop 83 and a second end stop 84.

Located on the same horizontal face 97 in between stops 83 and 84 is a double-sided stop assembly 99. Double-sided stop assembly 99 comprises a cam block 87 and an angled double-sided stop member 85 which is pivotally attached by pin 86 to cam block 87.

A lift linkage 90 is affixed to the side of shaft 82, and a solenoid 88 is connected by a solenoid core shaft 89 to a fork 110. The lift linkage 90 also comprises a pivotally mounted paddle or cam follower 92 as well as a guide cradle 112. Guide cradle 112 is also fixedly attached to the side of shaft 82 while lift form 110 is fixedly attached to the solenoid shaft 89. A pivot pin 91 is rotatably attached to both legs of lift fork 110 and passes through guide cradle 112 and cam base 92a of cam follower 92. Thus the cam follower can rotate in the lift fork 110 and be moved up and down in guide cradle slots 113.

Cam block 87 is preferrably contoured having dual symmetrically elevated surfaces 100 which reach their zenith at the center of cam block. A cam fork 87a is formed by side walls 94, 95 of the cam block. The cam fork 87a holds the double-sided stop 85 between the side walls 94, 95.

Double-sided stop lever 85 comprises a first leg 85a and a second leg 85b. Legs 85a and 85b each comprise a displaceable, selectively actuable stop against which the cam follower 92 can be brought to abut in order to arrest shaft rotation.

In operation of the embodiment of FIG. 3, when shaft 82, with cam follower 92 located at end stop 83, is rotated in the direction of end stop 84 (clockwise), cam follower 92 contacts the top surface of cam block 87. The cam follower 92 is then guided by cam block surfaces 100 to contact the underside of leg 85a of double-sided stop 85. Thus, stop 85 is rotated about block pin 86 in cam block 87, by the movement of cam follower 92 along the rising surface 100 of cam block 87. When leg 85b of the double-sided stop 85 contacts the surface 87c of the cam block 87, motion of the cam follower 92, and thus of the rotating shaft 82, is halted by leg 85a.

The cam follower 92 may be disengaged from the double-sided stop 85 by means of solenoid 88. Solenoid 88, when activated, causes lift fork 110 to guide cam follower 92 clear of the double-sided stop 85. When unimpeded travel between end stop 83 and end stop 84 is desired, solenoid 88 continues to lift cam follower 92 to a retracted position clear of the double-sided stop 85. Mechanism 90, as was the case with mechanisms 26 and 51 provides for fail-safe operation. Loss of power to actuator 88 allows gravity to cause cam follower 92 to drop and engage intermediate stop 99. These intermediate positions are used for fail-safe operation since they are the most useful for continued antenna use in an emergency.

Stop assembly 99 operates in the above-described manner regardless of direction of rotation of shaft 82. In practice of the present invention, the rotary motion of antenna shaft can be precisely arrested as described above. Furthermore, it will be appreciated that intermediate stop assemblies 26 of FIG. 1 and 51 of FIG. 2 operate to selectively capture a respective paddle within cooperating opposed stops 26, 27 (FIG. 1) or cooperating opposed faces 63b, 64b (FIG. 2). In the embodiment of FIG. 3, however, cam follower 92 is driven in a selected direction against either leg 85a or 85b of double-sided stop 85, and is arrested by the leg that cam follower 92 contacts.

While the invention has been particularly described with reference to the preferred embodiments thereof, it will be understood by those skilled in the art that various changes in substance and form can be made therein without having departed from the spirit and the scope of the invention as detailed in the attached claims.

We claim:

1. A bidirectional apparatus for selectively arresting rotation of an antenna shaft at a predetermined point in its axis of rotation, said shaft rotatably coupled to a stationary base, the apparatus comprising:
   an engageable member on said shaft;
   means for capturing said engageable member, said means for capturing being selectively interposeable in the path of said engageable member and comprising pivotable lever arms which are independently and individually connected to at least two springs which are also connected to the stationary base in a manner which forces the pivotable lever arms to prevent shaft rotation in one direction and to permit shaft rotation in one direction; and
   a solenoid actuator means connected to both said pivotable lever arms for controlling the engagement of said engageable member by said lever arms in order to selectively cause said shaft to be arrested at the predetermined point.

2. The apparatus according to claim 1, wherein said means for capturing comprises two pivotable lever arms, against either of which said engaging member can be brought to abut, which are pivotably linked to said stationary base and said actuator.

3. The apparatus according to claim 2, wherein said two pivotable lever arms comprise two opposed abutment surfaces.

4. The apparatus according to claim 1 wherein each of said pivotable lever arms further comprises a resilient contact surface.

5. An apparatus for arresting rotation of a shaft at a predetermined point in its axis of rotation, said shaft rotatably coupled to a base, said apparatus comprising:
   an engageable member protruding from said shaft; and
   means for selectively capturing said engageable member from either rotational direction, said means comprising
   (i) two pivotable lever arms having two opposed abutment surfaces,
   (ii) two springs, each of said springs attached to one of said pivotable lever arms and said base in a manner which urges said pivotable lever arms into engagement with said engageable member,
   (iii) an actuator attached to both of said lever arms, for selectively withdrawing said lever arms from engagement with said engageable member, and
   (iv) a crossbar member attached to both said lever arms and said actuator in a manner which permits said engageable member to push one of said pivot arms away from said shafts' axis of rotation, thus allowing the rotation of said engageable member past one of said pivot arms and the capturing of said engageable member between said pivot arms.

* * * * *